United States Patent
Wolfe et al.

(10) Patent No.: US 6,250,640 B1
(45) Date of Patent: Jun. 26, 2001

(54) BRUSH SEALS FOR STEAM TURBINE APPLICATIONS

(75) Inventors: Christopher Edward Wolfe, Niskayuna; Norman Arnold Turnquist, Cobleskill; Robert Harold Cromer, Johnstown; Osman Saim Dinc, Troy; Lawrence Edward Rentz, Clifton Park, all of NY (US); Roger Jordan Carr, Westminster, MA (US); Joseph Robert Toth, Latham, NY (US); Edward A. Dewhurst, Niskayuna, NY (US); Frederick George Baily, Ballston Spa, NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/135,334

(22) Filed: Aug. 17, 1998

(51) Int. Cl.$^7$ .................................................. F16J 15/447
(52) U.S. Cl. .......................... 277/355; 277/303; 277/416
(58) Field of Search .................................. 277/355, 350, 277/422, 305

(56) References Cited

U.S. PATENT DOCUMENTS

| | | |
|---|---|---|
| 768,593 | 8/1904 | Emmet et al. . |
| 779,785 | 1/1905 | Junggren . |
| 910,472 | 1/1909 | Junggren . |
| 957,887 | 5/1910 | Junggren . |
| 980,282 | 1/1911 | Junggren . |
| 1,352,277 | 9/1920 | Junggren . |
| 1,352,278 | 9/1920 | Junggren . |
| 1,505,647 | 8/1924 | Junggren . |
| 1,505,924 | 8/1924 | Warren . |
| 1,536,014 | 4/1925 | Junggren . |
| 1,594,838 | 8/1926 | Kégresse . |
| 1,651,855 | 12/1927 | Warren . |
| 1,670,071 | 5/1928 | Junggren . |
| 1,895,930 | 1/1933 | Junggren . |
| 2,336,323 | 12/1943 | Warren . |
| 2,600,991 | 6/1952 | Hargrove . |
| 2,709,338 | 5/1955 | Morley et al. . |
| 3,186,168 | 6/1965 | Ormerod et al. . |
| 3,463,498 | 8/1969 | Bill . |
| 3,759,038 | 9/1973 | Scalzo et al. . |
| 4,195,476 | 4/1980 | Wood . |
| 4,202,554 | 5/1980 | Snell . |

(List continued on next page.)

FOREIGN PATENT DOCUMENTS

| | | |
|---|---|---|
| 2938-484 | 3/1981 | (DE) . |
| 0453315 A1 | 10/1991 | (EP) . |
| 2 191 835 | 12/1987 | (GB) . |
| 421302 | 5/1947 | (IT) . |
| 3-209068 | 9/1991 | (JP) . |
| WO92/05378 | 4/1992 | (WO) . |
| WO9303299 | * 2/1993 | (WO) .................................. 277/303 |

OTHER PUBLICATIONS

"Positive Pressure Variable Clearance Packing," Morrison et al.,; GE Turbine Reference Library, 5/90.

Primary Examiner—Anthony Knight
Assistant Examiner—Mark Williams
(74) Attorney, Agent, or Firm—Nixon & Vanderhye

(57) ABSTRACT

A number of sealing segments 20 mounts a brush seal about a rotor. The tips of the brush seal 46 are maintained out of contact with the rotor surface throughout the entire operating range of the turbomachinery. Thus, the increase in temperature resultant from rubs between the bristle tips and the rotor 12 which effectively increase vibrations of the turbomachinery are eliminated. Brush seals are therefore maintained out of contact with the rotor throughout the entire operating range of the turbomachinery and thus do not affect the dynamic behavior of the rotor.

2 Claims, 2 Drawing Sheets

U.S. PATENT DOCUMENTS

| | | |
|---|---|---|
| 4,358,120 | 11/1982 | Moore . |
| 4,415,309 | 11/1983 | Atterbury . |
| 4,422,288 | 12/1983 | Steber . |
| 4,541,741 | 9/1985 | Woodbridge . |
| 4,567,730 | 2/1986 | Scott . |
| 4,580,346 | 4/1986 | Reichl . |
| 4,730,876 | 3/1988 | Werner et al. . |
| 4,756,536 | 7/1988 | Belcher . |
| 4,781,388 | 11/1988 | Wöhrl . |
| 4,785,623 | 11/1988 | Reynolds . |
| 4,809,990 | 3/1989 | Merz . |
| 4,901,522 | 2/1990 | Commaret et al. . |
| 4,971,336 | 11/1990 | Ferguson . |
| 4,989,886 | 2/1991 | Rulis . |
| 5,002,288 | 3/1991 | Morrison et al. . |
| 5,026,252 * | 6/1991 | Hoffelner .......................... 415/174.2 |
| 5,029,875 | 7/1991 | Spain et al. . |
| 5,029,876 | 7/1991 | Orlando et al. . |
| 5,066,025 | 11/1991 | Hanrahan . |
| 5,074,748 | 12/1991 | Hagle . |
| 5,076,590 | 12/1991 | Steinetz et al. . |
| 5,090,710 | 2/1992 | Flower . |
| 5,106,104 | 4/1992 | Atkinson et al. . |
| 5,110,033 | 5/1992 | Noone et al. . |
| 5,135,237 | 8/1992 | Flower . |
| 5,144,159 | 9/1992 | Baird et al. . |
| 5,174,582 | 12/1992 | Ferguson . |
| 5,176,389 | 1/1993 | Noone et al. . |
| 5,181,728 * | 1/1993 | Stec ........................................ 277/53 |
| 5,181,827 | 1/1993 | Pellow et al. . |
| 5,192,084 | 3/1993 | Norbury . |
| 5,201,530 | 4/1993 | Kelch et al. . |
| 5,318,309 | 6/1994 | Tseng et al. . |
| 5,335,920 | 8/1994 | Tseng et al. . |
| 5,351,971 | 10/1994 | Short . |
| 5,374,068 | 12/1994 | Jewett et al. . |
| 5,400,586 | 3/1995 | Bagepalli et al. . |
| 5,401,036 | 3/1995 | Basu . |
| 5,474,305 | 12/1995 | Flower . |
| 5,474,306 | 12/1995 | Bagepalli et al. . |
| 5,480,165 | 1/1996 | Flower . |
| 5,503,405 | 4/1996 | Jewett et al. . |
| 5,509,780 | 4/1996 | Synfelt . |
| 5,524,340 | 6/1996 | Galbraith et al. . |
| 5,597,167 | 1/1997 | Snyder . |
| 5,599,026 | 2/1997 | Sanders et al. . |
| 5,630,590 * | 5/1997 | Bouchard et al. ...................... 277/53 |
| 5,688,105 * | 11/1997 | Hoffelner .......................... 415/170.1 |
| 5,749,584 | 5/1998 | Skinner et al. . |
| 5,758,879 * | 6/1998 | Flower ................................ 277/303 |
| 5,884,918 * | 3/1999 | Basu et al. .......................... 277/355 |
| 5,971,400 * | 10/1999 | Turnquist et al. ................... 277/416 |

* cited by examiner

BRUSH SEALS FOR STEAM TURBINE APPLICATIONS

TECHNICAL FIELD

The present invention relates to a brush seal assembly for use in steam turbine applications which enables the use of brush seals between the stator and the rotor without affecting the dynamic behavior of the rotor.

BACKGROUND OF THE INVENTION

In aircraft and industrial gas turbine applications, brush seals are generally used to seal between rotating and static components. Generally, brush seals are assembled with an interference fit to the rotor in order to allow the bristles to wear in to a line-on-line condition vis-a-vis the rotor. In aircraft engine applications, the rotor is typically coated with a hard coating such as chrome carbide. The rotary components in aircraft and industrial gas turbines are generally stiff. Also, the dynamic behavior of the rotary component is generally not affected by the contact between the rotary component and the brush seal, i.e., the sealing contact between the free ends or tips of the brush seal and the rotary component.

Steam turbines, however, contrary to aircraft and industrial gas turbines, are designed and run above the rotor's first bending critical frequency and often run near the second bending critical frequency. It has been found that application of brush seals in steam turbines in accordance with conventional seal design theory, i.e., with contact between the tips of the bristles and the rotary component, causes the brush seals to impart vibrations to the rotor. It is believed that this is caused by sustained rubbing between the brush seals and the rotor, particularly where the rotor has a bow. Friction from the rubbing leads to uneven temperature distribution about the circumference of the rotor, with the high spot on the rotor increasingly becoming hotter. That is, if the rotor has a bow, the proud part of the rotor is preferentially heated by increasing friction-generated heat which, in turn, further increases the bowing of the rotor with resultant increased vibration.

It has also been found that brush seals do not provide thermal relief during start-up of a steam rotor turbine. At start-up, there is very a little steam flow through the turbine and essentially no steam flow past the brush seal. Without flow, the heat generated by rubbing between the brush seal and the rotor is not dissipated, exacerbating the build-up of heat in the rotor at the seal and particularly in the proud parts. It has been discovered that contact of the brush seals with a steam turbine rotor which operates near or above critical bending frequencies generates sufficient heat to affect rotor dynamic behavior in a manner which causes serious deleterious rotor vibrations.

Another phenomena which is believed to affect the dynamic behavior of the rotor caused by contact with the brush seal is the blow-down effect. Blow-down is the radial inward flow of upstream fluid passing through the brush seal, causing the bristles to tend to move inward toward the rotor. The blow-down effect increases bristle contact pressure and rotor heating when there is initial contact between the bristles and the rotor. It reduces or eliminates initial clearance where provided, tending to increase heating. In any effort to alleviate the rubbing heat-generating frictional contact between the brush seal and the rotary component, the phenomena of blow-down must be accommodated.

BRIEF SUMMARY OF THE INVENTION

In accordance with the present invention, a brush seal is located and sized to provide a clearance between the bristle tips and the rotary component throughout the entire range of operation of the turbomachinery, particularly accommodating the effects of blow-own and dimensional changes caused by temperature changes. Thus, in all operating conditions of the turbomachinery in accordance with the present invention, the brush seal is designed to provide a minimum clearance between the tips of the bristles and the rotary component. For example, even for the highest pressure drop across the seal and the highest flow across the seal, and accommodating the phenomena of blow-down and the thermal changes in dimension of the rotor and stator, the present invention always provides a minimum running clearance between the bristle tips and the rotor. In this manner, the vibrational problems alluded to above are minimized or eliminated. For example, for a given maximum pressure difference and maximum flow across the brush seal, if the rotor has a diameter of x, and the brush seal has a radial maximum of 10 mils of blow-down at that pressure and flow, and the maximum radial excursion of the shaft is 5 mils, then the inner radius of the bristle tips at start-up should be designed to be in excess of $x/2+15$ mils to maintain some clearance between the bristle tips and the rotor throughout the operating range. The decrease in sealing performance caused by the brush seal clearance as described above is minimal, while the benefits of precluding or minimizing vibrations are substantial.

In a preferred embodiment according to the present invention, there is provided turbomachinery comprising a rotary component rotatable about an axis and a stationary component about the rotary component and the axis, the rotary component having a maximum radial excursion relative to the axis throughout the entire range of operation of the turbomachinery, including from a start condition of the turbomachinery, a brush seal about the axis carried by the stationary component and having a plurality of bristles terminating in free ends spaced radially outwardly from the rotary component a radial distance relative to the axis in excess of the maximum radial excursion of the rotary component relative to the axis to maintain a radial clearance between the rotary component and the free ends of the bristles throughout the entire range of operation of the turbomachinery whereby the dynamic behavior of the rotary component is not affected by contact between the bristles and the rotary component.

In a further preferred embodiment according to the present invention, there is provided a method of installing a seal in turbomachinery having a rotary component rotatable about an axis, a stationary component about the rotary component and the axis, and a brush seal carried by the stationary component, comprising the step of providing bristles in the brush seal located to afford a clearance between tips of the bristles and the rotary component throughout the entire range of operation of the turbomachinery, including blow-down of the bristles and excursions of the turbomachinery responsive to temperature changes to prevent dynamic behavior of the rotary component from being affected by contact between the bristles and the rotary component.

In a still further preferred embodiment according to the present invention, there is provided in turbomachinery having a rotary component rotatable about an axis, a stationary component about the rotary component and the axis and a brush seal carried by the stationary component, a method of operating the turbomachinery comprising the step of operating the turbomachinery with a clearance between the bristle tips and the rotary component throughout the entire operating range of the turbomachinery to prevent dynamic behavior of the rotary component from being affected by contact between the bristles and the rotary component.

Accordingly, it is a primary object of the present invention to enable use of brush seals on turbine rotor components without affect on the dynamic behavior of the rotor whereby the turbine rotors may operate near critical bending frequencies without increased risk of rotor thermal bowing and consequent vibrations.

DETAILED DESCRIPTION OF THE INVENTION

Figure 1:
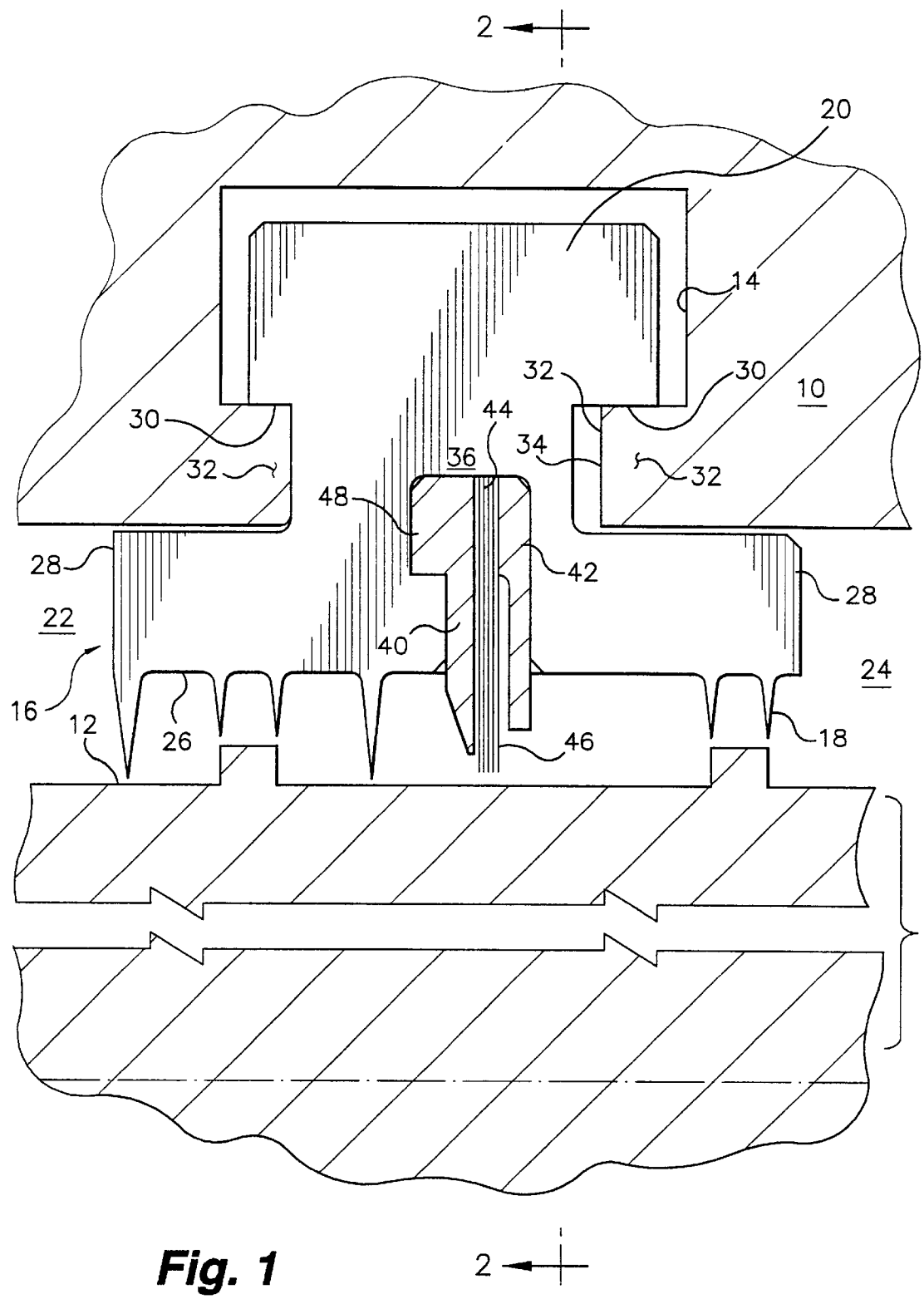
FIG. 1 is a cross-sectional view through a stator and rotor of turbomachinery illustrating a brush seal in a packing assembly in accordance with the present invention.
Figure 2:
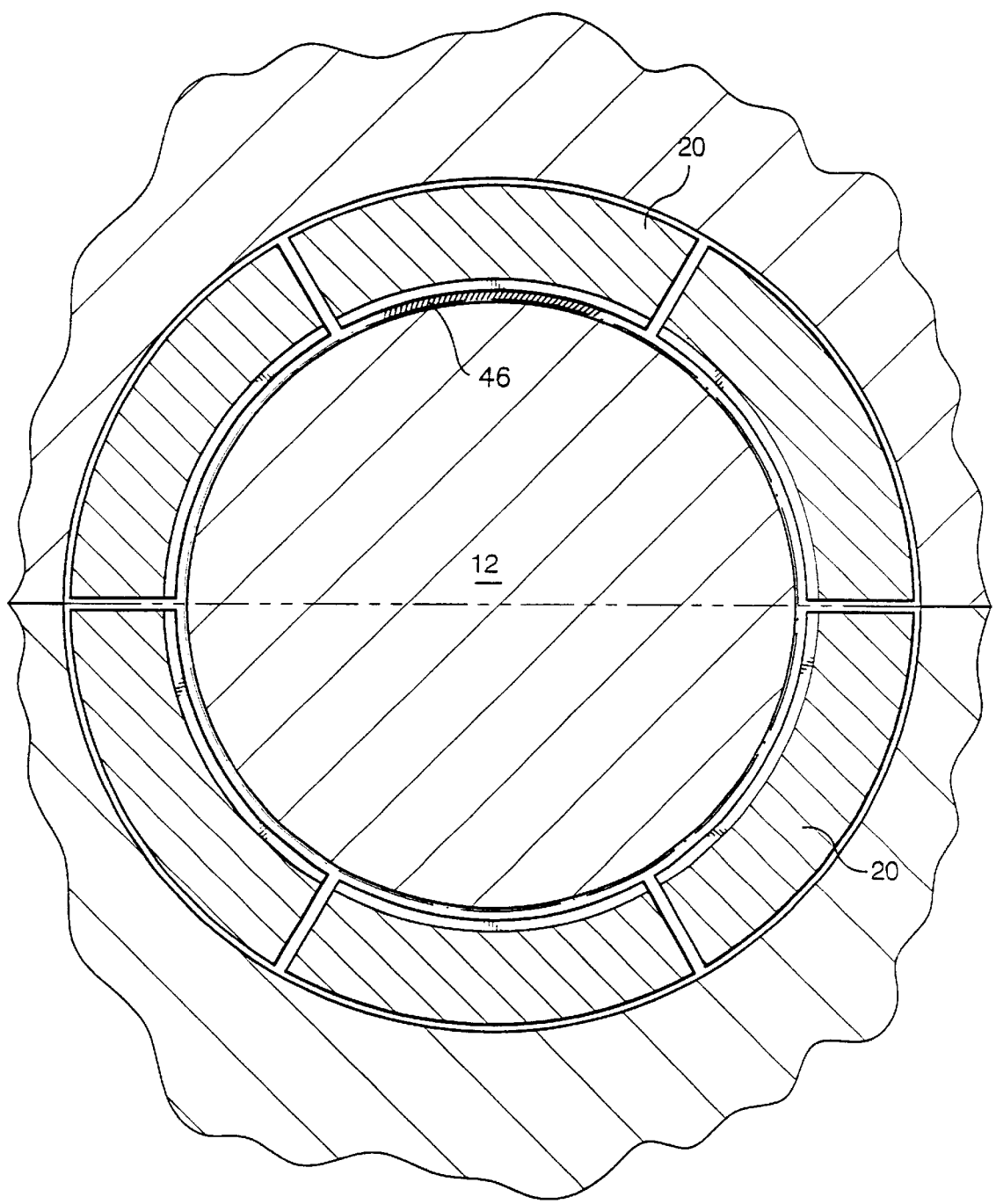
FIG. 2 is a cross-sectional view thereof taken generally about on line 2—2 in FIG. 1.

Referring now to FIG. 1, there is illustrated a stationary component 10 and a rotary component 12 forming part of turbomachinery, both the stationary and rotary components 10 and 12, respectively, lying about a common axis. The stationary component 10 has a dovetail groove 14 for receiving a packing ring assembly, generally indicated 16, mounting labyrinth sealing teeth 18 for providing a multi-stage labyrinth seal. Referring to FIG. 2, the packing ring assembly comprises a plurality of arcuate seal segments 20 arranged in a circumferential array about the rotor 12. Referring to FIG. 1 in general, the labyrinth seal functions by placing a relatively large number of partial barriers to the flow of steam from the high pressure region 24 on one side of the seal to a low pressure region 22 on the opposite side. Each barrier, i.e., tooth 18, forces steam attempting to flow parallel to the axis of the turbine shaft 12 to follow a tortuous path whereby a pressure drop is created. Thus, each seal segment 20 has a sealing face 26 with the projecting radial teeth 18. The sealing face 26 is formed by a pair of flanges 28 standing axially away from one another, although only one such flange may be necessary in certain applications. The radially outer portions of the seal segments 20 include locating hooks or flanges 30 which similarly extend from the segment 20 in axially opposite directions away from one another. The dovetail groove 14 includes a pair of locating flanges 32 which extend axially toward one another defining a slot 34 therebetween. A neck 36 of each segment 20 interconnects the flanges 30 and 28, the neck 36 extending in the slot 34.

It will be appreciated that the segments 20 of FIG. 2 may comprise positive pressure variable packing ring segments movable between opened outermost large clearance and closed innermost small clearance positions about the shaft 12. The segments are moved to their outermost positions by springs, not shown, disposed between the flanges 30 and the locating flanges 32 and inwardly by steam pressure. These types of variable clearance packing ring segments are known in the art, e.g., see U.S. Pat. No. 5,503,405 of common assignee.

A brush seal is provided in the packing ring segment to provide a combined labyrinth-brush seal. The brush seal includes a pair of plates 40 and 42 on opposite sides of a brush seal pack containing a plurality of bristles 44. The plate 40 includes an axially extending flange 48 for engaging in an axially opening recess in the slot of the seal segment 20 receiving the brush seal. The bristles 44 are preferably welded to one another at their radially outermost ends and project radially at a cant angle generally inwardly beyond the radial innermost edges of the plates 40 and 42 to terminate in free ends 46.

It will be appreciated that conventional brush seal practices require the free ends 46 of the bristle pack to normally engage the surface of the rotor to effect the sealing action. The bristles are considered sufficiently flexible to accommodate the radial excursions of the shaft. However, it has been discovered as part of the present invention that the dynamic behavior of the rotor is substantially affected by the contact between the rotor and the brush seals. With brush seals which continuously rub against the rotor, it will be appreciated that the friction generated increases the temperature about the circumference of the rotor. With the rotor having a bow as is typical in steam turbines, the proud part of the rotor is preferentially heated by contact between the rotor and the tips of the brush seal, with the rotor temperature at the proud part being increasingly elevated. This increased heat generation is exacerbated, particularly during start-up, when there is no cooling steam flow. Thus, with the brush seals assembled for interference with the rotor, the sustained rubs increase the temperature, causing further thermal deformation and bowing and, as a result, the vibrations to the turbomachinery increasingly worsen.

Moreover, the blow-down effect exacerbates the problem even further. Blow-down is a radially inward flow of higher pressure upstream fluid causing the bristles to deflect toward the shaft, hence increasing the force of contact between the bristles and shaft, generating even higher temperatures resultant from the frictional contact.

In accordance with the present invention and as illustrated in FIGS. 1 and 2, the bristle tips are intentionally designed to provide a clearance with the rotor shaft under all operating conditions of the turbomachinery from start-up through shut-down, including during blow-down effects. That is, the brush seal tips are spaced from the rotor a radial distance in excess of the maximum radial excursion of the rotor relative to the axis to maintain a radial clearance between the rotor and brush seal tips throughout the entire range of operation of the turbomachinery whereby the dynamic behavior of the rotor is not affected by contact between the bristles and the rotor. By eliminating any rubbing contact between the bristle tips and the rotor during the entire range of operation of the turbomachinery, friction-generated heat is avoided and the vibrations of the turbomachinery resultant from otherwise continued increased heat generated by the frictional contact are eliminated. Thus, the dynamic behavior of the rotor is not affected by the use of brush seals. While there is a decrease in sealing performance caused by the clearance between the bristle tips and the rotor, particularly at a cold start-up, the decrease in sealing performance is mitigated and the clearance is reduced to a certain extent by the bristle blow-down effect at operating pressure drop across the brush seal which causes the brush seals to deflect toward the rotor, decreasing the clearance. The design, however, maintains sufficient clearance to avoid rubbing contact, even with the blow-down effect for all operating conditions. The beneficial effects of eliminating vibration caused by heating effects of brush seals in contact with the rotor substantially outweigh any diminution of sealing resulting from the clearance between the brush seal bristle tips and the rotor.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Turbomachinery comprising:

a rotary component rotatable about an axis and a stationary component about said rotary component and said axis, said rotary component having a maximum radial excursion relative to the axis throughout the entire range of operation of the turbomachinery, including from a start condition of the turbomachinery;

a brush seal about said axis carried by said stationary component and having a plurality of bristles terminating in free ends spaced radially outwardly from said rotary component a radial distance relative to said axis in excess of the maximum radial excursion of the rotary component relative to said axis to maintain a radial clearance between said rotary component and said free ends of the bristles throughout said entire range of operation of the turbomachinery whereby the dynamic behavior of the rotary component is not affected by contact between the bristles and the rotary component.

2. In steam turbomachinery having a rotary component rotatable about an axis, a stationary component about the rotary component and said axis and a brush seal carried by said stationary component having bristles projecting toward said rotary component, a method of operating the turbomachinery comprising the steps of preventing dynamic behavior of the rotary component responsive to contact between the bristles and the rotary component by operating the turbomachinery with a clearance between the bristles tips and the rotary component throughout the entire operating range of the turbomachinery from start-up through shutdown and including through blow-down of the bristles and radial dimensional changes caused by temperature changes of the rotary component at the axial location of the brush seal.

* * * * *